May 9, 1944. G. ARSNEAU 2,348,588
POWER SAW
Filed March 29, 1943 2 Sheets-Sheet 2
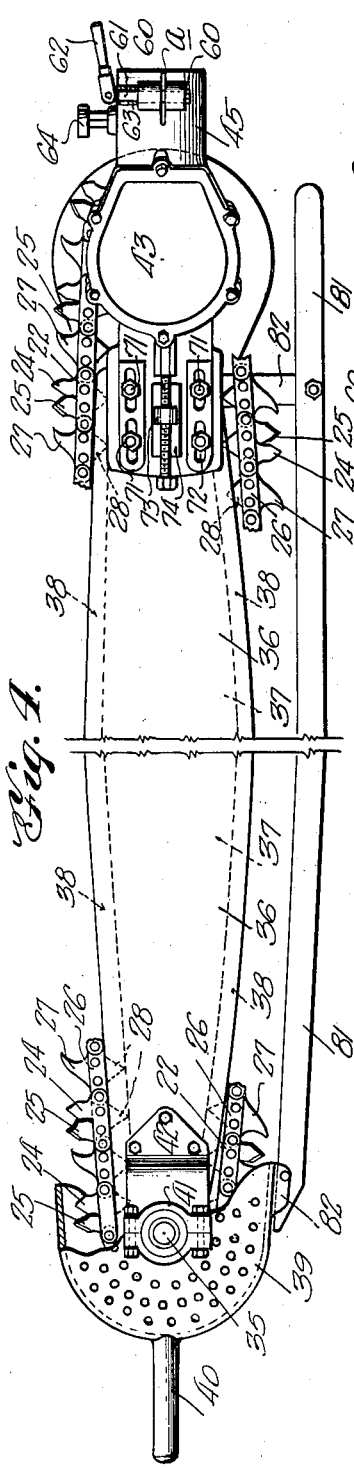
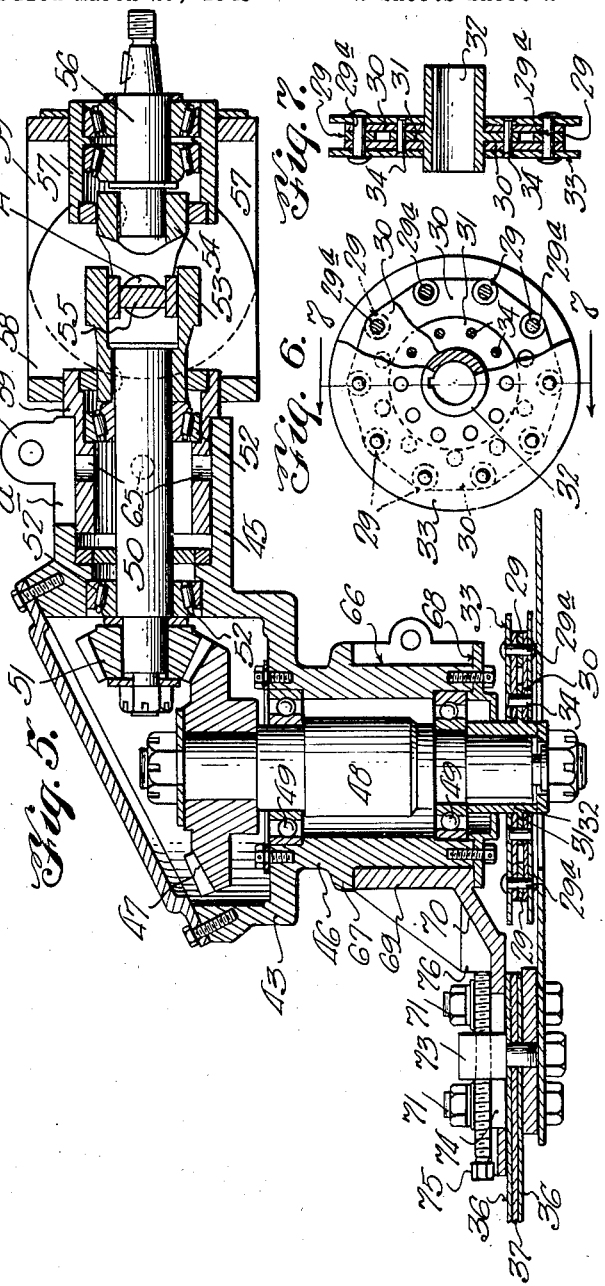
GEORGE ARSNEAU
INVENTOR.
BY
ATTORNEY Patented May 9, 1944

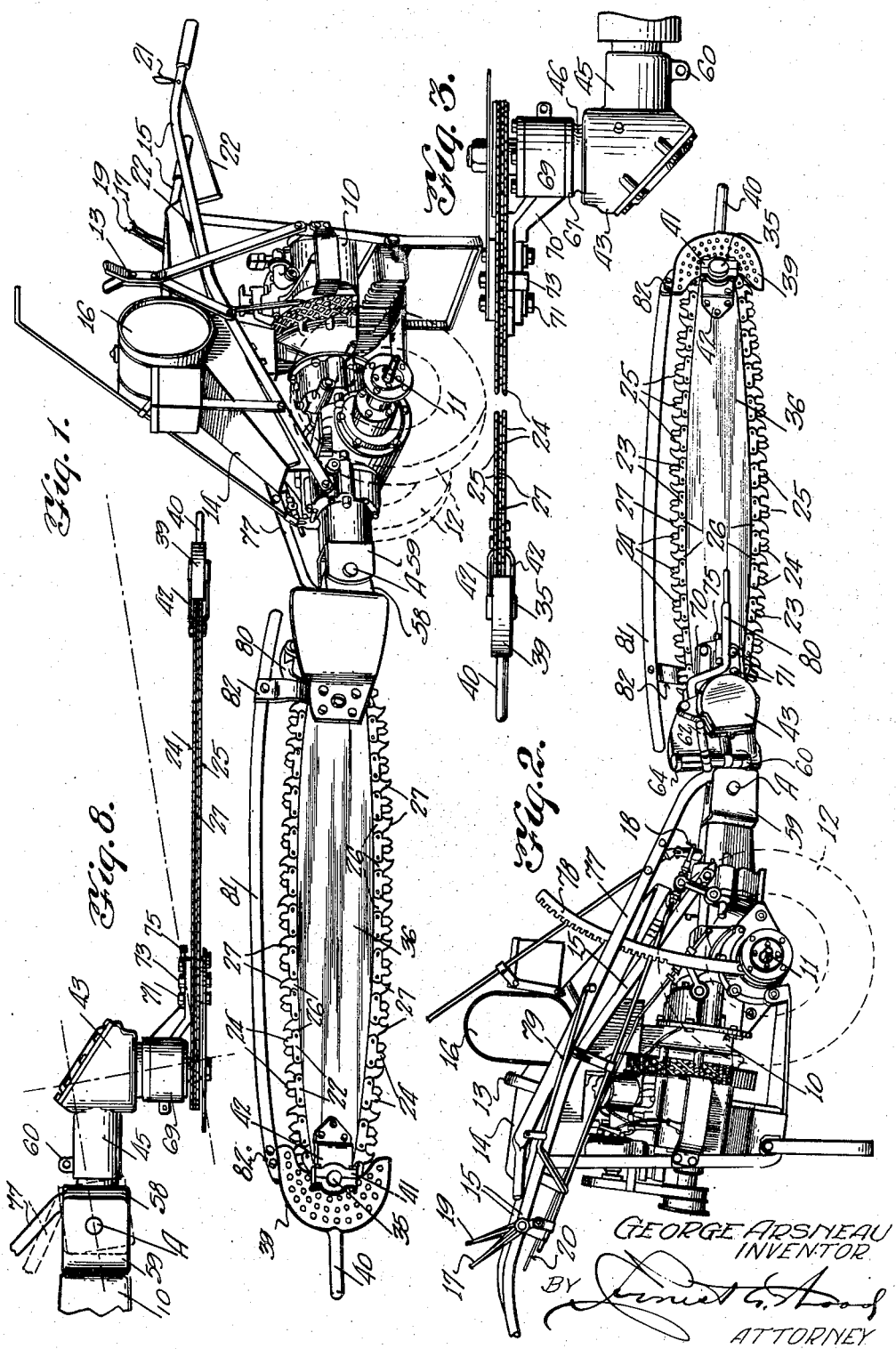

2,348,588

UNITED STATES PATENT OFFICE 2,348,588

POWER SAW

George Arsneau, Dallas, Tex.

Application March 29, 1943, Serial No. 480,936

12 Claims. (Cl. 143—32)

This invention relates to power driven saws and it has particular reference to the type of portable saw employed for felling and sawing timber.

The principal object of the invention is to provide a readily transportable and highly flexible sawing apparatus having, among its chief characteristics, the following:

(1) A self propelled power plant suitably controlled in all respects by a single operator walking behind the same; (2) An articulated or chain sawing element constrained to travel in a rigid frame to provide maximum work engaging surface and requiring the assistance of but one operator; (3) A power transmission and universal joint so designed and arranged that the saw element is rotatable on its longitudinal axis and may be operated by the power plant in any position vertically through a range of at least 90° and horizontally through a range of substantially 180° with equal and maximum efficiency.

Another and highly important object of the invention is to provide, through and by virtue of the aforementioned transmission and universal joint, a saw which can be conveniently and quickly coordinated with the work at any desired angle and under any and all reasonable working conditions, without affecting, to any appreciable extent, the plane of the power plant on which the latter operates with the greatest efficiency.

Still another object of the invention is to provide, through and by virtue of the transmission and universal joint, a portable sawing apparatus in which the saw assembly can be turned on its fulcrum to rest upon a suitable support situated above the power plant and in which position the entire apparatus may be readily transported from place to place.

Yet another object of the invention is to provide means operated from a position behind the power plant for actuating the saw on its fulcrum, disposed forwardly of the said power plant, for raising and lowering the saw, to accommodate the same to the cut in event of binding, said means being supplemented by devices for holding the saw in adjusted positions when necessary.

With the foregoing objects as paramount, the invention has particular reference to certain features of accomplishment, to become manifest as the description proceeds, taken in connection with the accompanying drawings, wherein:

Figure 1 is an elevational view of one side of a machine constructed according to the invention.

Figure 2 is an elevational view of the opposite side thereof.

Figure 3 is a detail view of the gear or transmission housing, showing the saw in an elevated position for cutting on a horizontal plane.

Figure 4 is a plan view of the saw per se with portions broken away.

Figure 5 is a vertical sectional view of the universal and transmission gear assembly.

Figure 6 is a cut-away view of the chain saw drive sprocket.

Figure 7 is a sectional view taken on line 7—7 on Figure 6, and

Figure 8 is a detail view of the saw in a position for felling a tree flush with the ground, showing in broken lines an adjusted plane thereof.

Continuing in more detail with the drawings, reference is primarily made to Figures 1 and 2 wherein numeral 10 denotes the power plant of the machine which, in the present case consists of an internal combustion engine. It will become apparent as the description proceeds that regardless of the angle at which the saw is positioned to operate, the engine 10 is seldom required to be moved out of its normal operating plane, as shown, inasmuch as the saw fulcrum, designated in the drawings at A, is situated forwardly of the axle 11, on which the wheels 12 are mounted, hence the saw can be positioned as shown in Figures 1, 2, and 3 as well as being capable of rearward inclination, to rest upon the support 13 of the machine frame. Moreover, in preparing the machine for shipment, it is found convenient to reverse the saw so that it will be disposed under and in parallel relation to the longitudinal axis of the engine 10, in which position it will be out of the way and will occupy little space.

Overlying the power plant 10 is a hood 14, supported upon the handles 15. Mounted in turn, upon the hood 14 is a fuel tank 16 which supplies fuel to the engine 10.

The handles 15 are disposed one on each side of the machine in a convenient position to be grasped by an operator at his position between the handles. Also, convenient to him is a lever 17, mounted on one of the handles 15 and which, through the medium of a rod 18, operates the forward and reverse gears of the engine 10. A companion lever 19 effects a change in speeds of the engine through a rod 20. On the opposite handle 15, there is mounted a throttle lever 21 which actuates the engine throttle by means of rods 22 (Fig. 1).

Referring now to the chain saw, it may be here mentioned that this element of the assembly is not herein considered as broadly new. However, the particular means, to be described presently, by which this saw is controlled and operated, is regarded as new and novel. This saw is comprised primarily of links 22 and 23 having teeth 24 and 25 respectively, the said links forming separate, parallel chains. Complementary to and interposed between the links 22—23 are short links 26, each having a drag or cleaner tooth 27 integral therewith and which alternate with the said teeth 24—25. The drag teeth 27 are so formed that tail portions 28 are provided, serving as sprocket teeth (Fig. 4) which engage between washers 29, mounted on pins 29a (Figs. 6 and 7) and held in interposed relation between inner plates 30 of the sprocket wheel shown in these figures and adapted to drive the chain saw. These plates 30 are spaced apart by the washers 29 and a flange 31 on a hub 32 and are embraced on each side by outer plates 33. The entire assembly is secured together by rivets 34. At the opposite or outer end of the saw assembly, a similarly constructed sprocket wheel is provided and mounted on the shaft 35. This, however, is an idler sprocket and due to its analogous construction to the drive sprocket, it is not considered necessary to illustrate the same.

The saw assembly per se is rigid, made so by the elongated plates 36 which are conforming and are spaced apart by an intermediate plate 37. The edges of the plate 37 are short of the common perimeter of the plates 36 so that there will be formed a channel 38 on either side of the plate assembly to accommodate the sprocket teeth 28 of the chain saw. In this manner the saw is constrained to travel in a predetermined course and with but a minimum of friction.

The forward end of the saw assembly carries a housing 39 which serves as a guard against injury to the operator while manipulating the saw by means of the handle 40, affixed to and extending outwardly from the guard. This housing also encases the idler sprocket about which the chain saw travels. Affixed to the bearings 41 in which the ends of the shaft 35 are journaled, are brackets 42, one on each side of the plate assembly 36. These brackets are bolted to the plates and serve to affix the housing guard 39 thereto.

In Figure 5 is shown in detail the transmission or driving gear arrangement and universal through which is obtained the high degree of flexibility of the saw. This arrangement consists primarily of a gear housing 43 having right angular tubular extensions 45 and 46. A beveled gear 47 is arranged in the housing 43 on the chain saw drive shaft 48, the latter extending through the extension 46 of the housing. The shaft 48 is suitably shouldered intermediate its ends to accommodate bearings 49 and upon its extended or outer end, the hub 32 of the drive sprocket, shown in detail in Figures 6 and 7, is mounted, as illustrated.

A shaft 50 extends axially through the housing extension 45 and carries upon one end a small beveled gear 51 whose teeth enmesh those of the larger gear 47. This shaft is journaled in roller bearings 52 and carries upon its opposite end a universal joint section 53, the latter being connected to a companion section 54 by means of a pin 55. This section 54 is in turn keyed to a stub shaft 56, also journaled in bearings 57 and suitably connected with the drive shaft of the power plant 10.

It is apparent from the foregoing that when the power plant 10 is put into operation to drive shaft 56, the shaft 50 will be rotated through the universal joint 53—54 to impart rotation to the saw drive shaft 48. The saw drive sprocket being secured to the end of shaft 48 is thus rotated and in this manner the chain saw is operated.

The universal joint 53—54 is housed by a pair of substantially U-shaped confronting members 58 and 59, which are pivotally joined at A, previously referred to as the fulcrum point of the saw assembly. A tubular member 59 is connected to the member 58 and is telescopically received in the end of the housing extension 45 so that it will be capable of rotation therein. This housing extension 45 is split at a and on each side of this split is an ear 60, the latter being aligned to receive a pin 61 (Fig. 4). A lever 62 is eccentrically pivoted to the pin 61 and by raising the free end of this lever so that its opposite end will bear upon the tubular housing 63 of the pin 61, the extension 45 is caused to contract and thereby firmly grip the tubular member 59, thus holding the elements securely against relative rotation to lock the housing 43 in position. This holding means is auxiliary to a locking means in the form of a spring retained pin 64 in the side of the extension 45 (Fig. 4), which enters one of a series of apertures 65 (Fig. 5) spaced annularly about the tubular member intermediate its ends. By moving the pin 64 outward against spring resistance, it is withdrawn from an aperture 65 thus disengaging the extension 45 from the tubular member 59 to allow the housing 43 to be freely rotated. When the housing has been adjusted to another position, the pin is released to return to a new aligned aperture 65. However, the positive locking means just described, being effective only to secure the housing and consequently the saw assembly in predetermined positions, the auxiliary holding means previously described may be employed to secure the saw assembly in desired intermediate positions.

The extension 46 of the gear housing 43 is provided with a bearing surface 66, defined by an annular shoulder 67 and a retainer plate 68 which supports the outer bearing assembly 49 in the extension 43. Mounted on this bearing surface is a collar 69 having an integral bracket 70 extending at right angles from its axis. It is by means of this bracket that the saw beam plates 36 are held in rigid relation to the collar 69 so that they will be at all times at right angles to the drive shaft 48. This bracket is secured to the plates 36 by bolts 71 which extend through slots 72 in the bracket 70 (Fig. 4). An interiorly threaded block 73 is affixed to the plate assembly 36 and extends through a slot 74 in the bracket 70. A threaded bolt 75 passes through the block 73 and bears against a shoulder 76 of the bracket. By loosening the bolts 71 and rotating the bolt 75, the plate assembly 36 may be moved longitudinally, thereby varying the tension on the chain saw.

In felling timber, there are cases when it is expedient to make the cut flush with the ground, while on the other hand, it is sometimes desirable to space the cut well above the ground to leave a stump. In making the former cut, the saw is positioned as suggested in Figure 5 while in the latter performance, a position as illustrated in Figure 3 is required. Also, in felling, a wedge shaped cleft is usually made in the tree to predetermine the direction of fall. It is a simple matter to adjust the housing 43 so that the saw will approach the tree at an angle to the horizontal to make this cut preparatory to felling and it is obvious that at whatever angle the saw is disposed for operation relative to the mounting or the work, there is no reduction in its efficiency.

The position of the saw assembly as illustrated in Figures 1 and 2 is that assumed in making vertical cuts as, for example, the cutting of a tree trunk after felling. In this and other duties, it is necessary that convenient means be provided for elevating the outer end of the saw. To accomplish this, a lever 77 is provided, whose lower end is affixed to the member 58 which, together with the complementary member 59 embraces the universal joint 53—54. This lever moves along a toothed rack 78 (Fig. 2) and is held in adjusted positions by a dog, actuated by the rod 79, companion to the lever 77.

In operation, two operators only are required, one attending the transporting medium and the other manipulating the saw. The machine is moved through the forest with the saw disposed forwardly of and in line with the machine. The machine is advanced upon the work and the holding device, consisting of the pivotally mounted and pointed rod 80 (Fig. 2) is thrust against the same to stabilize the machine. The saw operator then grasps the handle 40 at the outer end of the saw assembly and guides the saw upon the work, being protected in the operation from possible injury by the guard 81, mounted in brackets 82 along the leading edge of the saw. When the tree is felled, the saw assembly is rotated to the position shown in Figures 1 and 2, if it is desired to sectionize the felled trunk, and the same operation is proceeded with. When operations are suspended, the saw is turned rearwardly on its fulcrum to lie in an inclined plane upon the machine, to rest upon the support 13 or, in shipping, the saw is disposed under and parallel with the power plant, to lie between the wheels of the machine.

There are many conditions encountered in the felling of trees which have not been heretofore met by any other known felling machine. Among these has been the inability of the woodsman to overcome binding of and possible injury to the saw in the cut and in the absence of suitable provision therefor, a sawing machine however efficient it may otherwise be, is regarded as inadequate as a general purpose machine for felling trees. The present invention not only provides a slip clutch to permit continued operation of the engine without damaging the saw in case of obstruction in the cut but also provides, through the lever 77, a means by which the operator behind the machine may elevate or lower the saw either slowly or rapidly as conditions may require, thus removing the obstruction without loss of time or subjecting the saw or its attendant parts to undue strain. This operation is exemplified in broken lines in Figure 8 and cannot normally be accomplished by the assistant operator from his position in front of the machine.

The foregoing and other features described all apparently contribute to reduce the hardships of the woodsmen by rendering the machine highly flexible and capable of meeting and overcoming difficulties in the forest which may appear inconsequential but collectively result in great loss of time and are therefore costly.

Manifestly, the construction as shown and described is capable of some modification and such modification as may be construed to fall within the scope and meaning of the appended claims is also considered to be within the spirit and intent of the invention.

What is claimed is:

1. A sawing apparatus including a wheeled frame, a motor for transporting said frame, opposed handles for guiding said frame, means carried by said handles for controlling said motor, a chain saw operating on an elongated frame disposed forwardly of said wheeled frame, a universal joint operatively connected to the drive shaft of said motor, a pair of cooperating elements rotatably embracing said universal joint, one being pivotally connected to the other for relative arcuate displacement, a gear housing mounted on the outer of said elements and rotatable 360° in a plane transverse to said drive shaft, a pair of relatively right angular shafts, terminating in said gear housing, one of which is rotated through said universal joint, the other being gear connected with and rotated by the companion shaft and arranged to drive said saw and means for swingably mounting one end of said saw frame to said gear housing.

2. A sawing apparatus including a wheeled frame, a motor for transporting said frame, a universal joint operatively connected to the drive shaft of said motor forwardly of said frame, a housing for said universal joint comprised of relatively pivoted, complementary members, a gear housing rotatably mounted on the foremost of said members forwardly of said universal joint, a pair of relatively right angular shafts having gear connection in said housing, one of which is driven by said motor through said universal joint to transmit rotation to its companion shaft, a chain saw, an elongated, rigid frame therefor, means for mounting said frame at one end to said gear housing for swinging movement thereon and means effective for transmitting rotation of said companion shaft to said saw.

3. In a portable sawing machine, a wheeled frame having guiding handles, a motor for transporting said frame, a substantially flat, elongated saw frame, a chain saw surrounding said saw frame, a gear housing arranged for rotation entirely about a horizontal axis parallel with the drive shaft of said motor and to which said saw frames is connected at one end for arcuate swinging movement, relatively right angular shafts entering said housing and having gear connection therein, one of said shafts being connected flexibly to the drive shaft of said motor, the other being arranged to drive said chain saw, a fulcrum for said saw frame comprising a pair of relatively pivoted elements embracing the flexible connection between said shafts and to which said gear housing is rotatably connected and means for securing said gear housing and said saw frame against movement relative to their mounting points.

4. In a portable saw, a motor, a drive shaft therefor, a flat, peripherally grooved plate assembly, a chain saw constrained by said groove to travel about the periphery of said plate assembly, a drive sprocket engaging the chain of said saw, a shaft for operating said sprocket, a second shaft at right angles to said latter shaft, a universal connection between said second shaft and the drive shaft of said motor, a housing for said universal connection, mounted upon and rotatable about said drive shaft, a gear housing embracing the cooperating shafts, having pivotal and rotatable connection with said latter housing and arranged for rotation entirely about the axis of said second shaft, means connecting said plate assembly at one end to said gear housing for swinging displacement and separate means for securing said gear housing and said plate assembly against displacement from adjusted positions.

5. A portable sawing machine including a wheeled frame and a motor, a shaft operatively connected to the drive shaft of said motor, a universal joint intermediate the ends of said first shaft, a pair of rotatable, complementary members having fulcrum connection for relative arcuate displacement and forming a housing for said universal joint, a relatively right angular shaft driven by said first shaft, a flat, elongated and peripherally grooved plate assembly, a chain saw constrained by said groove to travel around the periphery of said plate assembly, a sprocket operated by said right angular shaft for driving said chain saw, a gear housing embracing said angularly related shafts and having connection with one of said complementary members for rotation entirely about the axis of said first shaft, means connecting said plate assembly at one end to said gear housing for swinging movement about the axis of said right angular shaft, means for securing said gear housing against rotation and means for securing said plate assembly against swinging movement.

6. A portable machine for felling and sawing timber comprising a wheeled frame and a motor, a flat, elongated and peripherally grooved plate assembly, a chain saw constrained by said grooves to travel about the periphery of said plate assembly, a drive shaft having a universal coupling intermediate its ends, a pair of relatively pivoted elements embracing said coupling and capable of rotation thereon, a substantially L-shaped housing, one end of which is connected to one of said elements, the other end supporting said plate assembly at one end forwardly of said frame for arcuate movement in a vertical plane, for rotation on a horizontal axis about its point of suspension and for swinging movement in a horizontal plane and means within said L-shaped housing for transmitting rotation from said drive shaft, to said chain saw from said motor.

7. A structure as set forth in claim 6 in which the plate assembly is capable of being secured at any selected position throughout its range of movement in the horizontal and vertical planes.

8. A structure as set forth in claim 6 in which means are provided on the machine frame for manually raising and lowering the forward end of the plate assembly and means for securing said latter means for sustaining said plate assembly in adjusted positions.

9. In a portable sawing machine, a frame; a motor thereon; a shaft driven by said motor; a universal joint intermediate the ends of said shaft; a pair of bearing members for said shaft at opposite sides of the joint respectively; means for shifting the outer bearing member for relative angular adjustment of the outer end of said shaft; a second shaft at right angles to the outer end of the first shaft and driven thereby; a chain saw assembly including a chain drive sprocket mounted on said right angular shaft; a housing embracing said angularly disposed shafts and rotatably mounted on the bearing member of the outer end of the first shaft for rotation completely about the axis thereof; and means connecting said chain saw assembly at one end to said housing for swinging movement about the axis of said right angular shaft.

10. In a machine as set forth in claim 9, said pair of bearing members comprising pivoted elements capable of rotation around said shaft.

11. In a machine as set forth in claim 9, means for securing the housing against rotation.

12. In a machine as set forth in claim 9, means for securing said chain saw assembly against swinging movement.

GEORGE ARSNEAU.